UNITED STATES PATENT OFFICE.

JOHN ASHUS, OF ROXBURY, MASSACHUSETTS.

BEVERAGE AND PROCESS OF MAKING SAME.

1,226,439.
Specification of Letters Patent.
Patented May 15, 1917.

No Drawing.
Application filed February 5, 1917. Serial No. 146,838.

*To all whom it may concern:*

Be it known that I, JOHN ASHUS, a citizen of Russia, residing at Roxbury, in the county of Suffolk, State of Massachusetts, have invented certain new and useful Improvements in Beverages and Processes of Making Same; and I do hereby declare the following to be a full, clear, and exact description of the invention, such as will enable others skilled in the art to which it appertains to make and use the same.

This invention is an improvement in beverages and the process for preparing the same and has particular reference to a base consisting of rye flour, water, lemon juice, hops, sugar and yeast.

The base for a determined amount of the beverage may be made according to the following formula:—one pound of rye flour; sufficient water added to make a dough; enough lemon juice to sour the dough to the proper degree; 1.1 ounces of hops; six quarts of boiling water; 1.2 pounds of sugar; 1.1 ounces yeast.

The beverage may be practically prepared as follows:—Place the required amount of rye flour into a bowl after first putting a sufficient quantity of lemon juice in said bowl to sour the flour to the necessary degree. Then add enough water to the flour to make a dough of the desired thickness and permit said dough to stand in a warm place for 12 hours. The dough is then shaped into a flat loaf and placed in an oven to bake after which the same is cut into slices of certain sizes which are put back into the oven and permitted to dry without burning. After the slices are sufficiently dry the same are ground into crumbs and to a pound of these crumbs is added 1.1 ounces of hops and six quarts of boiling water, the mixture being allowed to stand for six hours during which time the water will receive from the crumbs and hops the proper flavor. The mixture is then strained and heated to approximately 90° Fahrenheit and to a quart of the liquid is added 1.2 pounds of sugar and 1.1 ounces of yeast. This last mixture is then placed in a partially closed receptacle and allowed to ferment for about 3 hours after which the same may be placed in suitable containers.

What is claimed is:—

1. The herein described beverage comprising a liquid resulting from the fermentation of rye flour mixed with water, hops, sugar and yeast.

2. The herein described beverage comprising a liquid resulting from the fermentation of rye flour mixed with water and lemon juice, hops, sugar and yeast.

3. The herein described process of making a beverage including the mixing of a quantity of rye flour with water to form a dough, baking the dough, then drying and crumbling the same, placing the crumbs and a quantity of hops in heated water and straining the mixture, then adding sugar and yeast, and permitting the substance to ferment.

In testimony whereof, I affix my signature, in the presence of two witnesses.

JOHN ASHUS.

Witnesses:
MINNIE KUHFUSS,
OTTO LYDING.

Copies of this patent may be obtained for five cents each, by addressing the "Commissioner of Patents, Washington, D. C."